(12) United States Patent
Duncan et al.

(10) Patent No.: US 9,549,035 B2
(45) Date of Patent: Jan. 17, 2017

(54) AUTOMATIC UPDATING OF REDIRECTED LOCATION REFERENCES

(71) Applicant: Apple Inc., Cupertino, CA (US)

(72) Inventors: David D. Duncan, Cupertino, CA (US); Morgan H. Winer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 13/802,160

(22) Filed: Mar. 13, 2013

(65) Prior Publication Data

US 2014/0280468 A1    Sep. 18, 2014

(51) Int. Cl.
*H04L 29/08* (2006.01)
*G06F 17/30* (2006.01)

(52) U.S. Cl.
CPC ....... *H04L 67/2814* (2013.01); *G06F 17/3087* (2013.01); *G06F 17/30861* (2013.01); *H04L 67/02* (2013.01); *H04L 67/2842* (2013.01)

(58) Field of Classification Search
CPC .............................. G06F 17/30; G06F 24/21
USPC ....................................................... 709/203
See application file for complete search history.

(56) References Cited

U.S. PATENT DOCUMENTS

| 5,751,956 | A | 5/1998 | Kirsch |
| 6,578,078 | B1 * | 6/2003 | Smith et al. ................... 709/224 |
| 7,873,707 | B1 | 1/2011 | Subramanian et al. |
| 8,078,952 | B2 * | 12/2011 | Clinton et al. ................ 715/208 |
| 2001/0056500 | A1 | 12/2001 | Farber et al. |
| 2002/0116411 | A1 | 8/2002 | Peters et al. |
| 2004/0024848 | A1 | 2/2004 | Smith et al. |
| 2005/0015512 | A1 | 1/2005 | Kale et al. |
| 2006/0059416 | A1 | 3/2006 | Lin |
| 2006/0185021 | A1 | 8/2006 | Dujari et al. |
| 2007/0124664 | A1 | 5/2007 | Clinton et al. |
| 2012/0259832 | A1 | 10/2012 | Walker et al. |
| 2015/0207660 | A1 | 7/2015 | Sundaram et al. |

* cited by examiner

*Primary Examiner* — David Lazaro
*Assistant Examiner* — Zia Khurshid
(74) *Attorney, Agent, or Firm* — Kilpatrick Townsend & Stockton LLP

(57) ABSTRACT

Content items such as web pages can be updated through a client-driven process when the client detects that a target location reference in a source content item has been redirected to another (destination) location reference. Based on a target location reference in a source content item, a client can request a target content item from a target server and can receive a redirected destination target location reference. The client can update local information based on the redirection and/or report the redirect event to a source server that provided the source content item to the client. The source server can update the source content item based on the client's report.

28 Claims, 8 Drawing Sheets

400

402 — HTTP/n.m 301 Moved Permanently
404 — Location: http://srv-r.com/item2
Content-Type: text/html
Content-Length: bbb 406 {
<html>
    <head>
    </head>
    <body>
    </body>
</html>
}

UPDATEURL /item1 HTTP/n.m
506 — Host: http://srv-s.com/
508 — Referer: http://srv-s.com/item1

...

510 — X-Old-URL: http://srv-t.com/item2
512 — X-New-URL: http://srv-d.com/item2
514 — X-Redirect-Reason-Code: 301
516 — X-Redirect-Access-OK: Yes

*FIG. 5*

AUTOMATIC UPDATING OF REDIRECTED LOCATION REFERENCES

BACKGROUND

The present disclosure relates in general to content browsers and in particular to automatic updating of redirected location references associated with content items.

The World Wide Web is a highly decentralized Internet-based system that provides on-demand access to information stored on various servers connected to the Internet. The information is stored in the form of "web pages," which can include various combinations of information elements (text, graphics, images, video, audio, etc.). A typical web page includes one or more "links" that refer to other web pages on the same server or different servers. A page's author (human or automated) can create a link by associating an item (e.g., a word, phrase, image, or graphical element) on a page being created or edited with a reference to the location of another page. The location reference is generally in the form of a Uniform Resource Locator ("URL") that identifies a target server and a target location of a specific content item on that server, and the association of a URL with an element on the page can be established, e.g., using the <a> tag defined in HyperText Markup Language ("HTML").

Web pages are generally accessed by users operating browser clients that are capable of making requests for content items from various servers using protocols such as the HyperText Transfer Protocol ("HTTP"). The user can navigate from one page to another using the links provided on the various pages. For example, the browser client can present the web page with visual indicia to indicate links (e.g., changes in text color, font, or the appearance of a cursor when moved over the links). The user can select a link, e.g., by clicking with a mouse or touching on a touchscreen. In response, the browser client uses the associated location reference to formulate a request to a server for a different web page. This process is sometimes referred to as linking, or following a link.

The web, of course, is highly dynamic, and pages tend not to remain at fixed locations forever. This can result in "broken" links—i.e., instances where a server answers a browser client's request with a response indicating that the requested item is not present. To reduce this problem, it is possible to provide a forwarding address of sorts for pages that have been moved. For example, in HTTP, a server can respond to a client request for a page by providing a response with a status code in the 3xx series indicating that the requested page has moved and a "Location" header providing the new location of the page. A client that receives an HTTP response with a status code 3xx can use the Location header to formulate a new request. This is referred to as "redirection."

Redirection has been leveraged for other purposes, beyond just helping clients find pages that were moved. For instance, URLs can sometimes be quite lengthy and consequently cumbersome for users to share with other users (e.g., in environments where messages have character limits) or just difficult to remember or type correctly. Accordingly, a number of services have been created that leverage URL redirection to allow users to obtain shorter or more memorable aliases for URLs they find unwieldy. Examples include bit.ly (a service of bitly Inc.), t.co (provided by Twitter, Inc.), and tinyurl.com (a service of TinyURL, LLC). A link to a URL provided by one of these services redirects to the actual location of the page.

SUMMARY

Redirection and redirection services have various limitations. For example, a web server may not continue to provide redirect references indefinitely after a page has moved. Source pages that include the old URL may eventually develop broken links when the redirect reference ages out. As another example, a URL provided by a short-URL redirection service can be hard to distinguish from any other URL from the same service. Thus, for example, a user may remember that one of a dozen links on a particular page led to an interesting article from some source (e.g., the New York Times), but if all the links on the page refer to the same short URL service, it can be hard for the user to find the one she wants.

Certain embodiments of the present invention allow content items such as web pages to be updated through a client-driven process when the client detects that a target location reference in a source content item has been redirected to another (destination) location reference. For example, based on a target location reference in a source content item, a client can request a content item from a target server and can receive a response that indicates redirection and/or provides a destination target location reference for redirection. The client can request the content item from the destination target server based on the target location reference. In addition to obtaining the content item, the client can also report the redirect event to a source server that provided the source content item to the client. The source server can update the source content item based on the client's report, e.g., to replace the target location reference with the destination location reference provided by the client. The client can also update its local information based on the redirect, such as a cached copy of the source content item, a browser history, or the like.

The following detailed description together with the accompanying drawings will provide a better understanding of the nature and advantages of the present invention.

BRIEF DESCRIPTION OF THE DRAWINGS

FIG. 4 illustrates a message format for a redirect message according to an embodiment of the present invention.

FIG. 5 illustrates a message format for an update message according to an embodiment of the present invention.

DETAILED DESCRIPTION

Certain embodiments of the present invention allow content items such as web pages to be updated through a client-driven process when the client detects that a target location reference in a source content item has been redirected to another (destination) location reference. For example, based on a target location reference in a source content item, a client can request a content item from a target server and can receive a response that indicates redirection and/or provides a destination target location reference for redirection. The client can request the content item from the destination target server based on the target location reference. In addition to obtaining the content item, the client can also report the redirect event to a source server that provided the source content item to the client. The source server can update the source content item based on the client's report, e.g., to replace the target location reference with the destination location reference provided by the client. The client can also update its local information based on the redirect, such as a cached copy of the source content item, a browser history, or the like.

Figure 1:
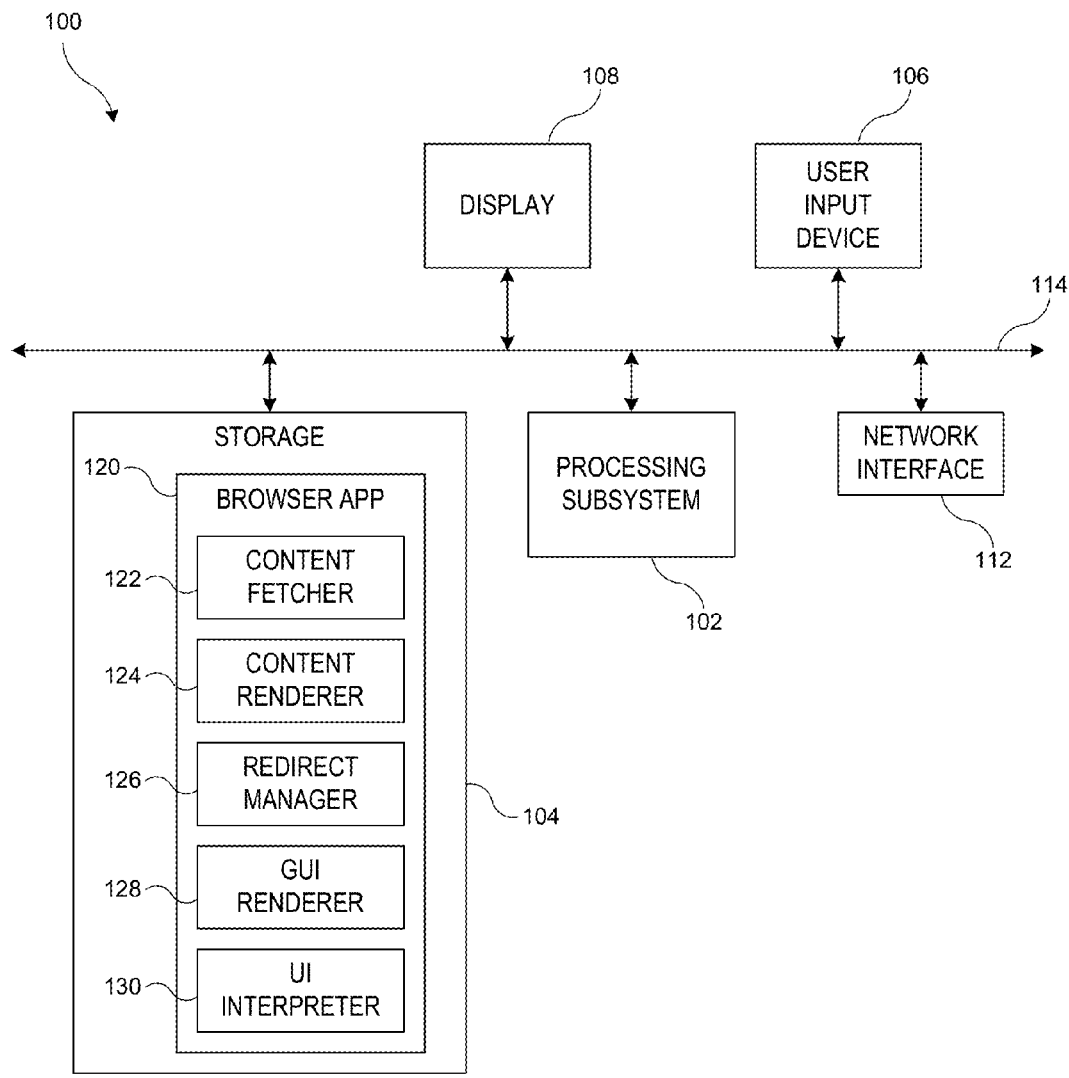
FIG. 1 is a block diagram of a computer system according to an embodiment of the present invention.

FIG. 1 is a block diagram of a computer system 100 according to an embodiment of the present invention. System 100 can be implemented in any type of user-operable computing device, including desktop computers, laptop computers, tablet computers, handheld devices (e.g., smart phones, media players), and so on. System 100 can include a number of components such as processing subsystem 102, storage subsystem 104, user input device 106, display 108, and network interface 112 communicating via bus 114.

Processing subsystem 102 can include a single processor, which can have one or more cores, or multiple processors. In some embodiments, processing subsystem 102 can include a general-purpose primary processor as well as one or more special-purpose co-processors such as graphics processors, digital signal processors, or the like. In some embodiments, some or all processors in processing subsystem can be implemented using customized circuits, such as application specific integrated circuits (ASICs) or field programmable gate arrays (FPGAs). In some embodiments, such integrated circuits execute instructions that are stored on the circuit itself. In other embodiments, processing subsystem 102 can execute instructions stored in storage subsystem 104.

Storage subsystem 104 can include various memory units such as a system memory, a read-only memory (ROM), and a permanent storage device. A ROM can store static data and instructions that are needed by processing subsystem 102 and other modules of computer system 100. The permanent storage device can be a read-and-write memory device. This permanent storage device can be a non-volatile memory unit that stores instructions and data even when computer system 100 is powered down. In some embodiments, a mass-storage device (such as a magnetic or optical disk or flash memory) can be used as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 104 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 104 can include removable storage media that can be readable and/or writeable; examples of such media include compact disc (CD), read-only digital versatile disc (e.g., DVD-ROM, dual-layer DVD-ROM), read-only and recordable Blu-ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 104 can store one or more software programs to be executed by processing subsystem 102, such as a browser application 120. "Software" refers generally to sequences of instructions that, when executed by processing subsystem 102 cause computer system 100 to perform various operations, thus defining one or more specific machine implementations that execute and perform the operations of the software programs. The instructions can be stored, e.g., as firmware residing in read-only memory and/or applications stored in magnetic or other storage media that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 104, processing subsystem 102 can retrieve program instructions to execute and data to process in order to execute various operations including operations described below.

A user interface can be provided by one or more user input devices 106, display device 108, and/or and one or more other user output devices (not shown). Input devices 106 can include any device via which a user can provide signals to computing system 100; computing system 100 can interpret the signals as indicative of particular user requests or information. In various embodiments, input devices 106 can include any or all of a keyboard, touch pad, touch screen (e.g., a touch-sensitive overlay on a display surface of display 108), mouse or other pointing device, scroll wheel, click wheel, dial, button, switch, keypad, microphone, and so on.

Display 108 can display images generated by computing system 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 108. Examples include indicator lights, speakers, tactile "display" devices, printers, and so on.

In some embodiments, the user interface can provide a graphical user interface, in which visible image elements in certain areas of display 108 are defined as active elements or control elements that the user selects using user input devices 106. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular area on display 108. Other user interfaces can also be implemented.

Network interface 112 can provide voice and/or data communication capability for computer system 100. In some embodiments, network interface 112 can include radio frequency (RF) transceiver components for accessing wireless voice and/or data networks (e.g., using cellular telephone technology, advanced data network technology such as 3 G, 4 G or EDGE, Wi-Fi (IEEE 802.11 family standards), or other mobile communication technologies, or any combination thereof, GPS receiver components, and/or other components. In some embodiments, network interface 112 can provide wired network connectivity (e.g., Ethernet) in addition to or instead of a wireless interface. Network interface 112 can be implemented using a combination of hardware (e.g., antennas, modulators/demodulators, encoders/decoders, and other analog and/or digital signal processing circuits) and software components.

Bus 114 can include various system, peripheral, and chipset buses that communicatively connect the numerous components of computer system 100. For example, bus 114 can communicatively couple processing subsystem 102 with storage subsystem 104. Bus 114 can also connect to input devices 106 and display 108. Bus 114 can also couple processing subsystem 102 to a network through network interface 112. In this manner, computing system 100 can be connected to a network of multiple computer systems (e.g., a local area network (LAN), a wide area network (WAN), an Intranet, or a network of networks, such as the Internet. Any or all components of computer system 100 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing subsystem 102 can provide various functionality for computing system 100. For example, processing subsystem 102 can execute browser application 120. Browser application 120 can provide various functionality such as the ability to retrieve and display content items from local or remote sources (e.g., using HTTP or other data transfer protocols to retrieve and display web pages) and the ability to receive and interpret user input pertaining to the content items, such as selection of an item to view, submission of data by the user in response to a particular content item (e.g., filling out a form on an interactive web page), and so on.

In some embodiments, browser application 120 can incorporate various interoperating modules (e.g., blocks of code) that, when executed, implement aspects of browser operation. For example, browser 120 can include a content fetcher 122, a content renderer 124, a redirect manager 126, a GUI renderer 128, and a UI interpreter 130.

Content fetcher 122 can include instructions for interpreting location references such as URLs or other identifiers of content items to be retrieved and displayed, as well as instructions for interacting with network interface 112 to fetch the content items. Content renderer 124 can include instructions for interpreting fetched content items and rendering displayable images (including still and/or video images). In some instances, the content items may include audio, and content renderer 124 can render audio as well as images. Content fetcher 122 and content renderer 124 can incorporate conventional or other techniques for fetching and rendering content items (e.g., HTML interpreters, audio and/or video streaming programs, etc.).

Redirect manager 126 can communicate with content fetcher 122 and/or content renderer 124 to detect and process redirect events. As used herein, a "redirect" event can occur when, in response to a request for a content item, content fetcher 122 receives a redirection to a different location. For example, where content fetcher 122 uses HTTP (the HyperText Transfer Protocol) to request content items using URLs, a response may include a status code indicating redirection (e.g., HTTP status codes in the 3xx series) and a location header providing a URL for a new location of the content item. As another example, where a content item is an HTML file, the HTML header can include a refresh metatag that provides a URL for a content item to be fetched instead. In some embodiments, redirect manager 126 can be notified when content fetcher 122 and/or content renderer 124 detects a redirect event. When a redirect event occurs, redirect manager 126 can facilitate the updating of content items locally to browser 120 and/or remotely at the source of the content item, which can be, e.g., a web server connected to the Internet. Examples of redirect-event processing are described below.

GUI renderer 128 can create graphical user interface (GUI) elements to be presented to the user along with the content items rendered by content renderer 124. GUI renderer 128 can include code defining the location and appearance of GUI elements, such as navigation buttons (forward, back), a URL input box, a search query input box, and the like. UI interpreter 130 can receive user input, e.g., via user input device 106, and can interpret the input to determine actions to be performed by browser application 120. For example, UI interpreter 130 can determine which GUI element the user selected and initiate the corresponding action (e.g., fetching a content item based on a URL entered by the user). In some embodiments, GUI interpreter 128 and UI interpreter 130 can incorporate conventional or other techniques for interpreting user input.

It will be appreciated that computer system 100 is illustrative and that variations and modifications are possible. Computer system 100 can have other capabilities and components not specifically described here (e.g., mobile phone, global positioning system (GPS), camera, power management, various connection ports for connecting external devices or accessories, etc.). Further, while computer system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Browser application 120 is also illustrative, and specific implementations may include more or fewer modules than described herein. Certain aspects of browser application 120 can be implemented using conventional techniques.

Figure 2:
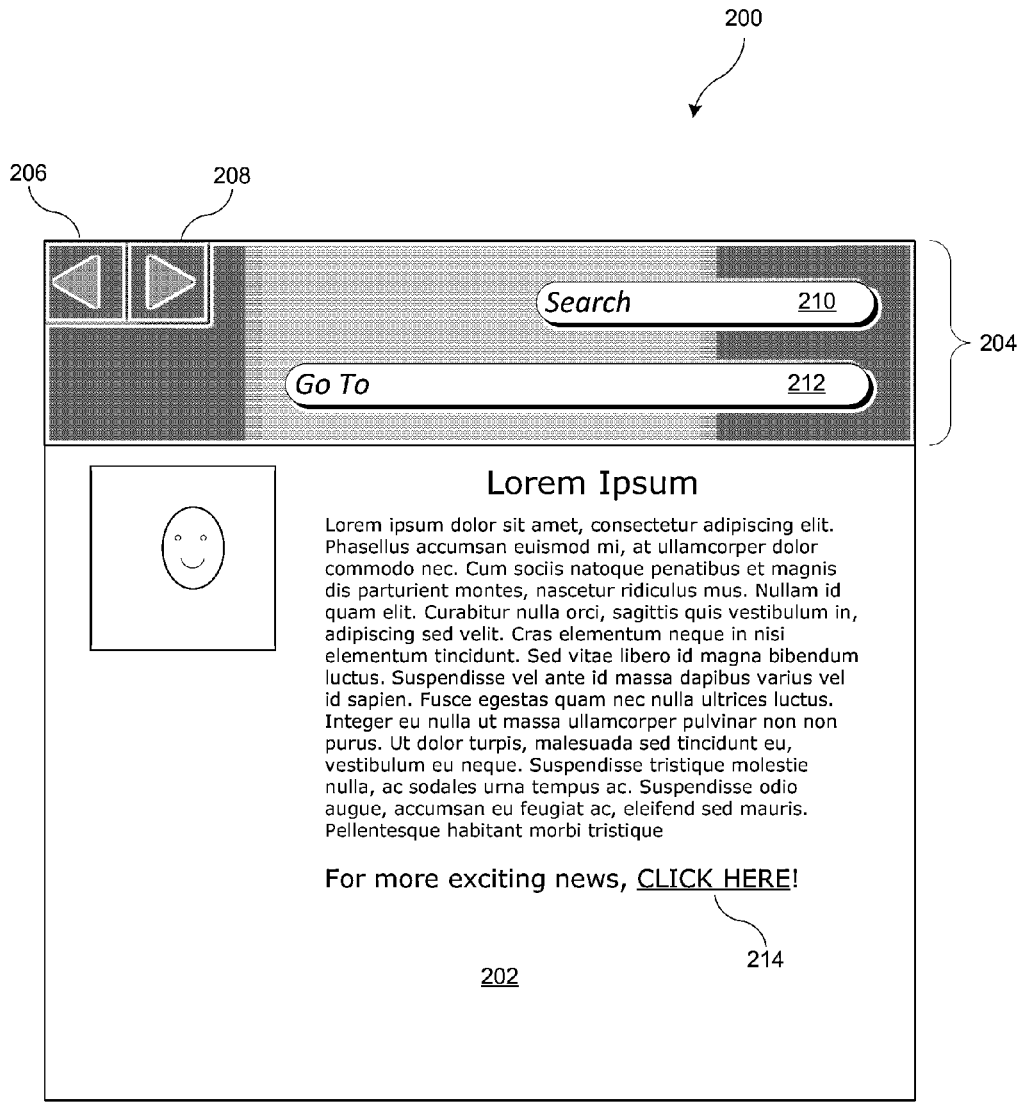
FIG. 2 illustrates a browser screen displaying a content item with a link that can be redirected according to an embodiment of the present invention.

FIG. 2 illustrates a browser screen displaying a content item with a link that can be redirected. Browser screen 200 can be rendered, e.g., on display 108 of computer system 100. Depending on the particular implementation of system 100, screen 200 may fill the entire display area, or it may be rendered (e.g., in a window) in a portion of the display area.

Browser screen 200 includes a content display area 202 in which content items (e.g., web pages) can be rendered. In some embodiments, rendering of content is controlled by content renderer 124 based on content fetched by content fetcher 122. Content items can include any combination of text, image, audio, video, or any other elements capable of being presented to a user. In some instances, some portions of a content item can be rendered as hyperlinks, such as hyperlink 214. Hyperlink 214 can be a visually distinct element that is selectable by a user to initiate retrieval of a linked content item. Depending on implementation, hyperlinks can be distinguished by various attributes such as size, font, font color, underlining, highlighting, and so on. In some instances, a hyperlink can be presented as a graphical element (e.g., a button or other image), and a content item can include any number of hyperlinks.

Browser screen 200 also includes a GUI area 204 where various user-operable control elements not specific to a particular content item can be presented. For example, the control elements can include back and forward navigation buttons 206, 208, search bar 210, and URL ("Go To") bar 212. A user can navigate between recently viewed pages using buttons 206, 208. A user can execute a search using a selected search engine by entering a query into search bar 210. A user can also find a web page by entering the URL (or a portion thereof) into URL bar 212. It is to be understood that other control elements can be added or substituted for those shown.

Figure 3:
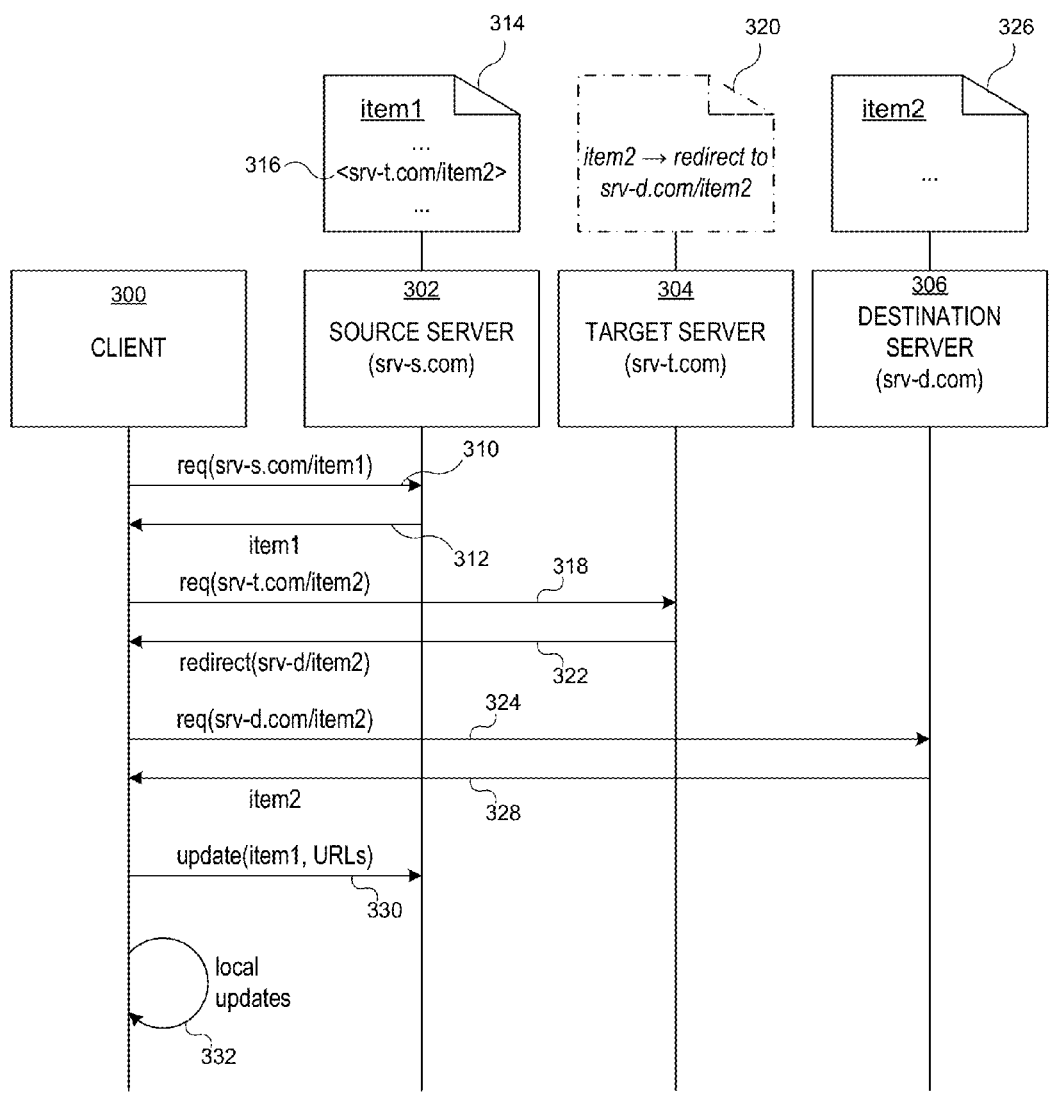
FIG. 3 illustrates an example of message-passing that can occur between a browser client and various servers according to an embodiment of the present invention.

A user can interact with browser screen 200, e.g. by selecting hyperlink 214 to cause retrieval and presentation of a different content item. FIG. 3 illustrates an example of message-passing that can occur between a browser client 300 and various servers 302, 304, 306 according to an embodiment of the present invention. Browser client 300 can be implemented, e.g., using computer system 100 of FIG. 1. Servers 302, 304, 306 can be implemented as computer systems of generally conventional design, e.g., including processors, storage media, communications and/or interface components similar to those described above.

Client 300 can request a first content item ("item1") from source server 302 by sending a message 310. Message 310 can be, for example, an HTTP GET request or the like. Depending on circumstances, client 300 can generate message 310 automatically (e.g., to load a "home" page on startup) or in response to user input (e.g., user selection of a link in a currently presented content item such as link 214 in FIG. 2).

In response, source server 302 can locate and return the requested content item 314 by sending message 312, which can be, e.g., an HTTP response that includes the content of item 314. Client 300 can present content item 314 to the user. As shown, content item 314 can contain a link (or other reference) 316 to another item (item2), specifying a location on target server 304.

In response to user input (or other events), client 300 can send a request for item2 to target server 304. In this example, target server 304 determines (e.g., based on a data record 320) that item2 is not present and that client 300 should be redirected. Accordingly, target server 304 can send a redirect message 322, informing client 300 that item2 can be found at destination server 304.

In some embodiments, redirect message 322 can be an HTTP redirect message having a format similar to message 400 shown in FIG. 4. In this example, status line 402 provides a status code of 301, indicating a permanent redirection, and Location header 404 provides the destination location reference. In this example, the content portion 406 of message 400 is blank; in other embodiments, message 400 can include content to be presented (e.g., an advisory to the user that the content item has been moved and/or that browser client 300 is being redirected).

Referring again to FIG. 3, in response to receiving message 322, client 300 can generate a new request message 324 to destination server 306 for item2. Destination server 306 can respond by locating the requested content item page 326 and returning item2 to client 300 by sending message 328. Client 300 can then present content item 326 to the user. (It should be noted that, although this example uses the label "item2" in both the target and destination location references, it is not required that content item 326 be identical to any item that is or ever was stored at the target location reference.)

In addition, client 300 can alert source server 302 that link 316 in content item 314 was redirected, e.g., by invoking redirect manager 126 of FIG. 1. For example, client 300 can send an update message 330. FIG. 5 illustrates a format for update message 330 according to an embodiment of the present invention. In this example, update message 330 is formatted as an HTTP request message with a request code 502 of "UPDATEURL" and an indicator 504 of the content item to which the message pertains.

Other elements of the message can provide additional information. For example, line 506 can provide a host identifier of source server 302. Line 508 can identify the referrer as content item 314, the item to which the update message pertains. Old-URL line 510 can provide the target location reference that was redirected (in the example of FIG. 3, this is the reference to srv-t.com/item2), and new URL line 512 can provide the destination location reference to which the client was redirected (in the example of FIG. 3, this is the reference to srv-d.com/item2).

Lines 514 and 516 represent additional information that can be provided about the redirect event. For example, line 514 can provide the HTTP status code from the redirect response. Line 516 can indicate whether client 300 was able to access the resource at the destination location.

It is to be understood that the update message format of FIG. 5 is illustrative and that variations and modifications are possible. It is not required that all content source servers be capable of recognizing an update message. Any servers that do not recognize the message can send back a response so indicating, and in some embodiments, client 300 can proceed without waiting for a response to an update message. Where a particular content source server does recognize the update message, the server can take action to update the location reference in the source content item to which the update message pertains; examples of such action are described below.

Referring again to FIG. 3, in addition to (or in some instances instead of) sending update message 330 to notify source server 302 of the redirection, client 300 can also perform local updates, represented by client-local message 332. For example, in some embodiments, client 300 can update a local cached copy of item1 to replace the target location reference with the destination location reference; update a browser history trail (e.g., a list of location references for content items the user has viewed) to remove the target location reference, keeping only the destination location reference; and/or update other information.

It will be appreciated that the message sequence and messages shown in FIG. 3 are illustrative and that variations and modifications are possible. For example, in FIG. 3, source server 302, target server 304, and destination server 306 are represented as different servers. Those skilled in the art will understand that a content item can link to a different content item on the same server (or in some instances, even back to its own location, as in a "refresh this page" link); accordingly, source server 302 and target server 304 can be the same server. Similarly, a redirect message can redirect to a different location on the same server, and target server 304 and destination server 306 can be the same server. Accordingly, the same server can act at various times as any or all of a source server, target server, and/or destination server. The message sequence can be modified, and a redirect can be received in response to some, all, or none of a particular client's requests for content items from a particular server. Other messages can also be added to the sequence; for instance, the client can send requests to modify a content item. Further, while specific examples using HTTP and URLs have been described, other protocols and formats for communicating location references and other information can also be used.

Figure 6:
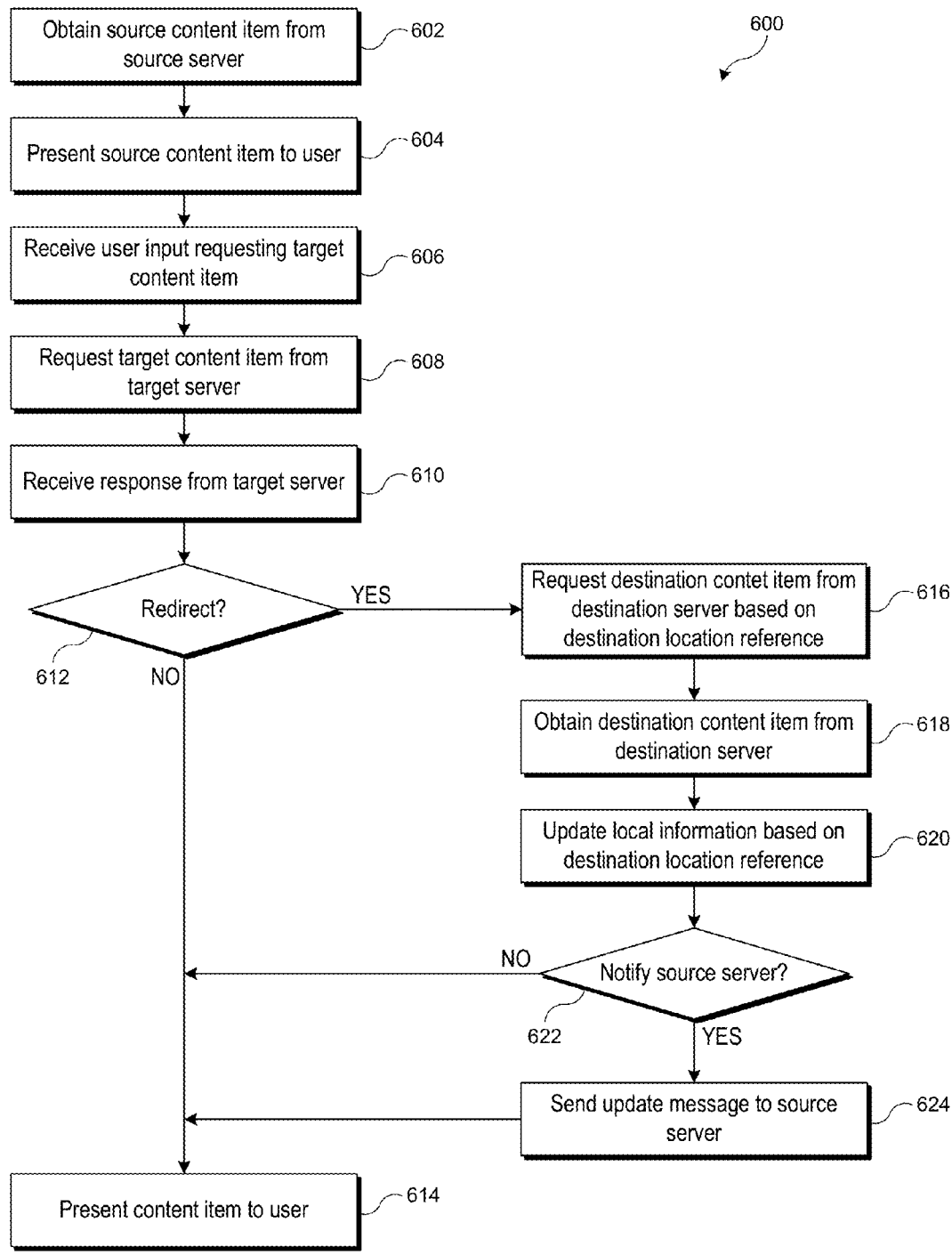
FIG. 6 is a flow diagram of a process for retrieving and presenting content items by a client according to an embodiment of the present invention.

FIG. 6 is a flow diagram of a process 600 for retrieving and presenting content items by a client according to an embodiment of the present invention. Process 600 can be implemented, e.g., in browser application 120 of FIG. 1 or other program code executing on suitable processing hardware, to implement client 300 of FIG. 3.

At block 602, client 300 can obtain a source content item (e.g., content item 314) from a source server (e.g., server 302), e.g., by exchanging messages 310 and 312 as shown in FIG. 3. In some embodiments, content fetcher 122 of FIG. 1 can implement code to manage the parsing of a location reference and generating a request that can be sent via network interface 112. At block 604, client 300 can present the source content item to the user. For example, content renderer 124 of FIG. 1 can read the source content item and generate a visual representation on display 108. At block 606, client 300 can receive user input requesting a target content item, e.g., item2. For example, UI interpreter 130 of FIG. 1 can detect a user input event, such as a mouse click, and determine that the event indicates that the user has requested the target content item.

At block 608, client 300 can generate a request for the target content item and send the request to the target server (e.g., server 304 in FIG. 3). For example, UI interpreter 130 of FIG. 1 can invoke content fetcher 122 to parse the location reference and generate a request that can be sent via network interface 112.

At block 610, client 300 can receive a response from the target server (e.g., by delivery of a response to content fetcher 122). At block 612, client 300 can determine whether the response is a redirect. For example, if the response includes a status code, content fetcher 122 can read the status code and determine whether the status code corresponds to a redirection status code (e.g., the 3xx status codes in HTTP). If the response is not a redirect, then at block 614, client 300 can present the target content item to the user.

If, however, the response at block 612 is a redirect, then client 300 can request the destination content item from the destination server based on a destination location reference include in the redirect response. For example, after determining that the response is a redirect, content fetcher 122 can further parse the response to extract the destination location reference and can generate a request to destination server 306 that can be sent via network interface 112. At block 618, client 300 can receive the destination content item from the destination server.

At block 620, client 300 can update local information based on the destination location reference. For example, content fetcher 122 can alert redirect manager 126 that a redirect event occurred and can provide details such as identifiers of the source content item, the location reference in that item that was redirected (the target location reference), and the location reference to which content fetcher 122 was redirected (the destination location reference).

Redirect manager 126 can be programmed or otherwise configured to perform various local updates in response to such an alert. For example, in some embodiments, browser application 120 maintains a cache of content items it has previously retrieved (e.g., to reduce network traffic by reducing the need to re-request items), and redirect manager 126 can modify the cached copy of the source content item to replace the target location reference with the destination location reference. If browser application 120 subsequently presents the cached copy of the source item to the user and the user again attempts to access the target content item, content fetcher 122 will skip the redirection because the destination location reference is already there. Accordingly, faster response to a user's link requests can be achieved, e.g., by skipping the exchange of messages 318 and 322 of FIG. 3.

In some instances, the source content item itself (in addition to any cached copy) may be locally stored, and in this case, redirect manager 126 can update the source content item, assuming that browser application 120 has modification access rights to the source content item. In some embodiments, the user may be prompted to confirm that the source content item should be modified. Updating the source content item can eliminate the redirection for all subsequent accesses, including accesses by different clients.

As another example, browser application 120 can maintain a table of known redirections that maps destination location references to redirection location references. Before making a request for a target content item, content fetcher 122 can access this table to determine whether it "knows" the response will be a redirect; if so, content fetcher 122 can substitute the destination location reference for the target location reference, allowing the exchange of messages 318 and 322 of FIG. 3 to be skipped. In some embodiments, redirect manager 126 can update the table of redirection information at block 620, allowing browser application 120 to accumulate redirection information and avoid making requests that were previously redirected.

As yet another example, browser application 120 can maintain a browsing history, which can include a list of location references for content items that have been previously retrieved, along with other related information (e.g., date and time of retrieval, title or other metadata associated with the content item, how long the user spent viewing the item, what link(s) the user followed to a next item, etc.). In some embodiments, content fetcher 122 adds location references to the history as items are requested, and this can include location references that turn out to redirect elsewhere. Accordingly, in some embodiments, redirect manager 126 can "clean" the history by removing any target location references that were redirected, leaving only the destination location reference. Where redirect manager 126 cleans locations that were redirected from the browsing history, a user operating a browser client's "back" button to backtrack along a sequence of previously presented content items does not have revisit any redirect events that may have occurred. In addition, a user reviewing history (e.g., in a history window provided by the browser application) can avoid selecting an entry that turns out to be redirected. This can also be useful, e.g., in the case of redirections provided by short-URL services, where the target URLs (which reference the redirection service and may be optimized for brevity rather than ease of recognition by a human) may not provide helpful clues to re-finding an item of interest that was previously viewed.

Figure 7:
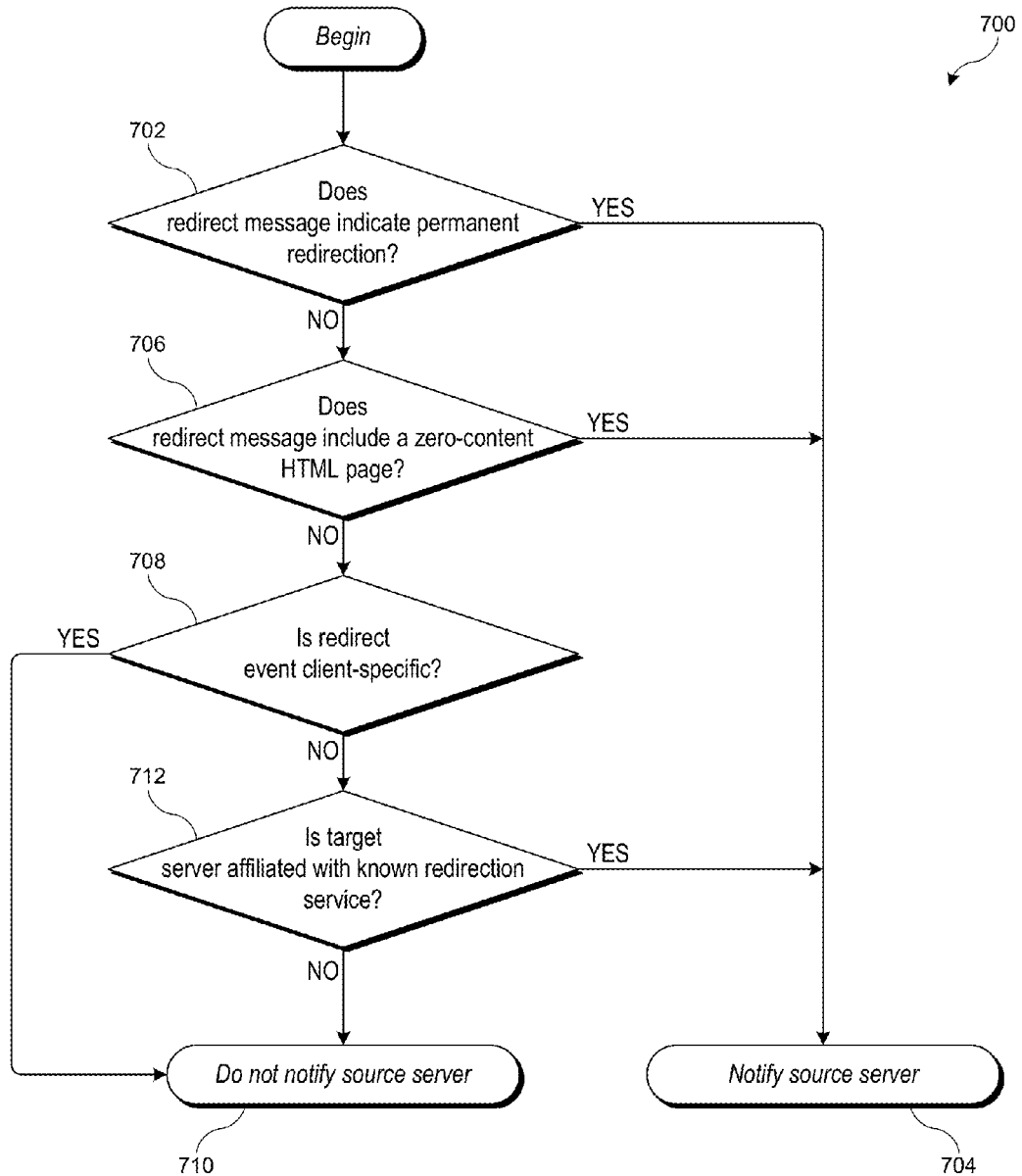
FIG. 7 is a flow diagram of a process for determining whether to alert a source server to a redirect event according to an embodiment of the present invention.

Referring again to FIG. 6, at block 622, client 300 can determine whether the source server (the server that hosts the source content item) should be notified of the redirect event. This determination can be based on various decision criteria. By way of example, FIG. 7 is a flow diagram of a process 700 for determining whether to alert a source server to a redirect event according to an embodiment of the present invention. Process 700 can be used, e.g., to implement block 622 of FIG. 6.

At block 702, process 700 can determine whether the redirect message indicates a permanent redirection. For example, in the case of HTTP redirection messages, different status codes within the 3xx series can indicate different reasons for redirection, such as permanent redirection (status code 301), redirection to one of a set of alternatives (status code 300), or temporary redirection (status code 307). Block 702 can include reading the status code to determine whether the redirection is permanent or not. If the redirection is permanent, then the decision can be made to notify the source server at block 704.

At block 706, process 700 can determine whether the redirect message includes zero content (i.e., nothing to be presented to the user). For example, in the context of HTTP responses, a zero-content redirect message can be similar to that of FIG. 4, where content portion 406 includes nothing to be presented to the user. If the message includes zero content, process 700 can infer that the redirect is likely permanent and can decide to notify the source server at block 704.

At block 708, process 700 can determine whether the redirect event is client-specific. For example, large companies may provide separate servers for customers in different geographic regions (e.g., North America, South America, Europe, Asia, or specific countries), and a request for content from a main server (e.g., from a server named www.company.com) can be redirected to a regional server (e.g., n-am.company.com or asia.company.com) depending on a client's geographic region as inferred by the main server from the request. Process 700 can detect client-specific redirect events in various ways. For example, in some instances, a client-specific redirect message may have HTTP status code 300 or some other status code indicating that one of multiple possible redirections is being made. As another example, process 700 can compare the names of the target server and the destination server to detect whether a redirection is likely based on a client-specific factor; for instance, if the first portion of the server name changed from something generic like "www" to something else like "n-am" or "us" or "cn," then it is likely that the redirect event was client-specific. In some embodiments, determining that the redirect event is client-specific at block 708 may result in a decision not to notify the source server at block 710.

At block 712, if no decision has been made, process 700 can determine whether the target server is affiliated with a known redirection service (e.g., whether the target server name matches a server name belonging to a known redirection service such as "bit.ly" or "t.co"). Where this is the case, in the embodiment shown, process 700 can decide not to notify the source server at block 710.

It will be appreciated that the decision process of FIG. 7 can be modified. For instance, in some implementations, the outcomes of the decision at block 712 can be reversed, on the assumption that while a redirection service may have been used by an author to facilitate entering a location reference into a content item, such a reference is less helpful after the initial entry, given that computers can manage long location references just as easily as short ones. Alternatively, updating content items to replace redirection-service URLs with the destination URLs can make the content items more robust against future events such as discontinuation of the redirection service or eventual reuse of a URL by the service. In some embodiments, other decision criteria can be added and/or decision criteria shown in FIG. 7 can be removed. In some embodiments, a decision can be based on weighing of multiple criteria rather than a series of separate binary decisions as shown.

Referring again to FIG. 6, if the decision at block 622 is to notify the source server, then at block 624, client 300 can send an update message to the source server. In some embodiments, an update message similar to message 330 of FIGS. 3 and 5 can be used. Such a notification message can allow the source server to take various actions, examples of which are described below. At block 614, the destination content item can be presented to the user. If further user input is received, process 600 can return to block 606 to allow the user to continue browsing.

It will be appreciated that process 600 is illustrative and that variations and modifications are possible. Steps described as sequential may be executed in parallel, order of steps may be varied, and steps may be modified, combined, added or omitted. For instance, in some embodiments, a server may respond to a request for a content item with something other than the content item or a redirect message (e.g., an error message); accordingly, additional types of responses and consequent actions can be incorporated into process 600. Similarly, types of user input other than selecting a link in a source content item can lead to a redirect event, including manual entry of a location reference (e.g., into URL bar 212 of FIG. 2), search query inputs (e.g., into search bar 210), or the like.

Further, in some embodiments, it is possible that a redirect message may provide a destination location reference that, when requested, results in a second redirect message. Where this is the case, process 600 can repeat block 616 until a message other than a redirect is received. (In some embodiments, the number of consecutive redirects can be limited, e.g., to prevent a potentially infinite loop caused by cyclic redirections.) In some embodiments, when multiple redirects occur between requesting an item from an initial target location and obtaining the item from a final destination location, updating of the local information and/or update messages to the source can eliminate all the intermediate steps. Where a redirection terminates due to excessive number of redirects, the client can alert the user to the problem and can also send an update message to the source server to report the problem. For example, using the message format of FIG. 5, the client can indicate at line 516 that access failed due to excessive number of redirects and can leave the new location reference at line 512 blank (or omit line 512 entirely).

In some embodiments, updating of local information can be made conditional. Decision criteria for updating local information can be similar to those described above (e.g., with reference to FIG. 7) or different; for example, a client-specific redirect event may result in updating local information (on the assumption that the particular client will always be redirected to the same destination) even if an update message is not sent to the source server. Conversely, in some embodiments, sending an update message to the source server in the event of a redirect can be made unconditional, and the source server can apply decision criteria to determine whether to act on an update message and/or what particular action to take.

Decision criteria for updating local information and/or sending an update message to a source server can also be varied. For example, different flags or indicators can be included in a response message to indicate information about the redirection. As another example, in some embodiments, client 300 can parse text or other content in the redirect message to detect indications of a permanent redirection. For instance, the redirect message may contain content such as "We've moved. Visit us at srv-d.com" or "The page you are looking for is temporarily unavailable. In the meantime, visit srv-d.com." Such content can be interpreted to indicate either permanent or temporary redirection. In some embodiments, client 300 may have other sources of information indicative of a permanent relocation of a content item, e.g., in connection with a corporate rebranding effort.

In some embodiments, it can happen that a client making a request to a destination server after having been redirected receives a message indicating that the access is not permitted. For example, some website operators choose to prevent "deep linking" within their site and reroute any traffic from external referrers to the site's main page. Or, in some instances, an item that was previously available to the public may have been moved into an area of the destination site where access is limited to subscribers, and the requesting client might not identify itself as a subscriber (e.g., by providing login credentials in the request). Hence, requests for pages within a destination site that come from a referrer (e.g., content item 314) that is not part of the site can result in an error message or a redirection to the site's home page, a login page, or other permitted access point.

Figure 8:
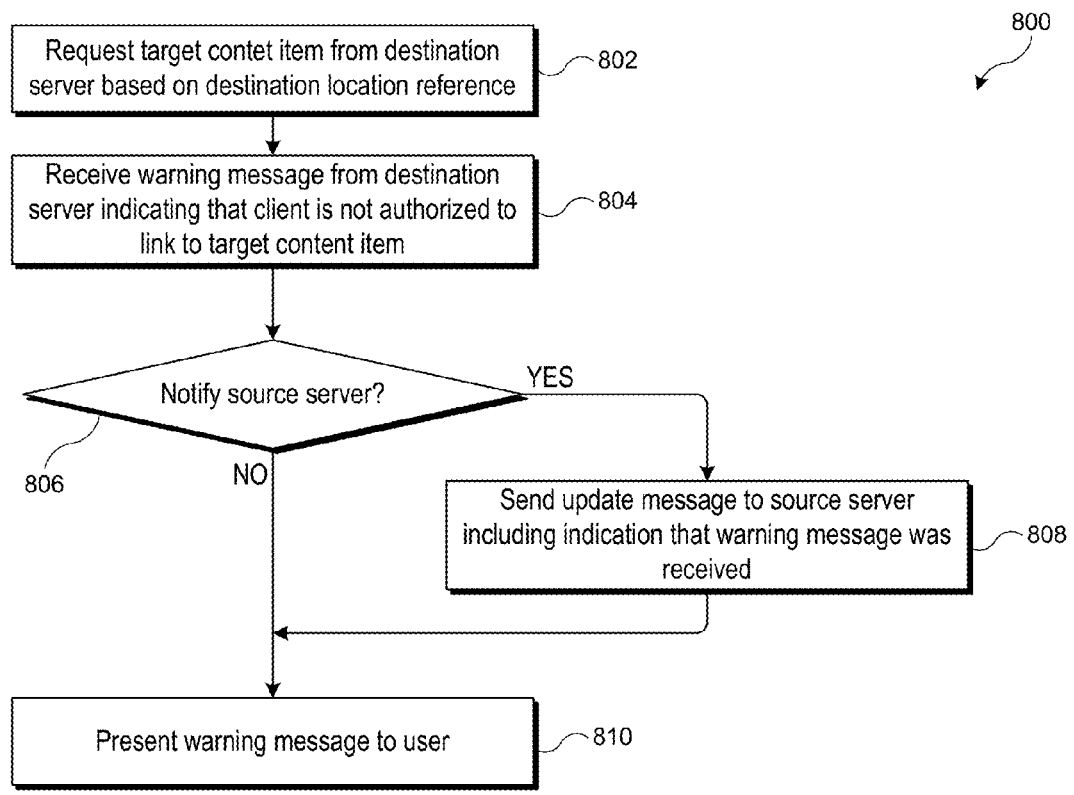
FIG. 8 is a flow diagram of a process for handling a restricted-access redirect event according to an embodiment of the present invention.

FIG. 8 is a flow diagram of a process 800 for handling a restricted-access redirect event according to an embodiment of the present invention. Process 800 can be incorporated into process 600 described above. For example, block 802 can correspond to block 616 of process 600 and can include client 300 requesting a destination content item from a destination server based on a destination location reference received in a redirect event. At block 804, client 300 can receive a warning message from the destination server indicating that client 300 is not authorized to link directly to the destination content item. In some embodiments, this warning message can also include a redirect message, e.g., to redirect client 300 to a main page or other content item to which direct access is authorized, in which case, client 300 can make another request to obtain the authorized content item. At block 806, client 300 can determine whether to notify the source server of the warning message. Decision criteria described above or similar criteria can be used, and in some instances, the notification can be unconditional. If the decision is to notify the source server, then at block 808, client 300 can generate and send an update message to the source server. In some embodiments, the update message can be similar to message 330 of FIG. 5 and can include, e.g., at line 516, an indication that access to the location identified at new location line 512 was denied. At block 810, client 300 can present an advisory to the user indicating that the requested access was denied. In some instances, the advisory can include content from the warning message received from the destination server and/or a prompt to allow the user to indicate an action (e.g., retry, go back, etc.). In embodiments where the warning message includes a further redirection, block 810 can be skipped in favor of requesting and presenting a different page based on the further redirection.

In some embodiments, process 800 can include updating local information, e.g., updating the browser history to remove the destination location reference to which access was denied as well as the target location reference that was redirected to the destination location reference. If the warning message provides a further redirection to an authorized content item, that location reference can be preserved in the browser history.

Figure 9:
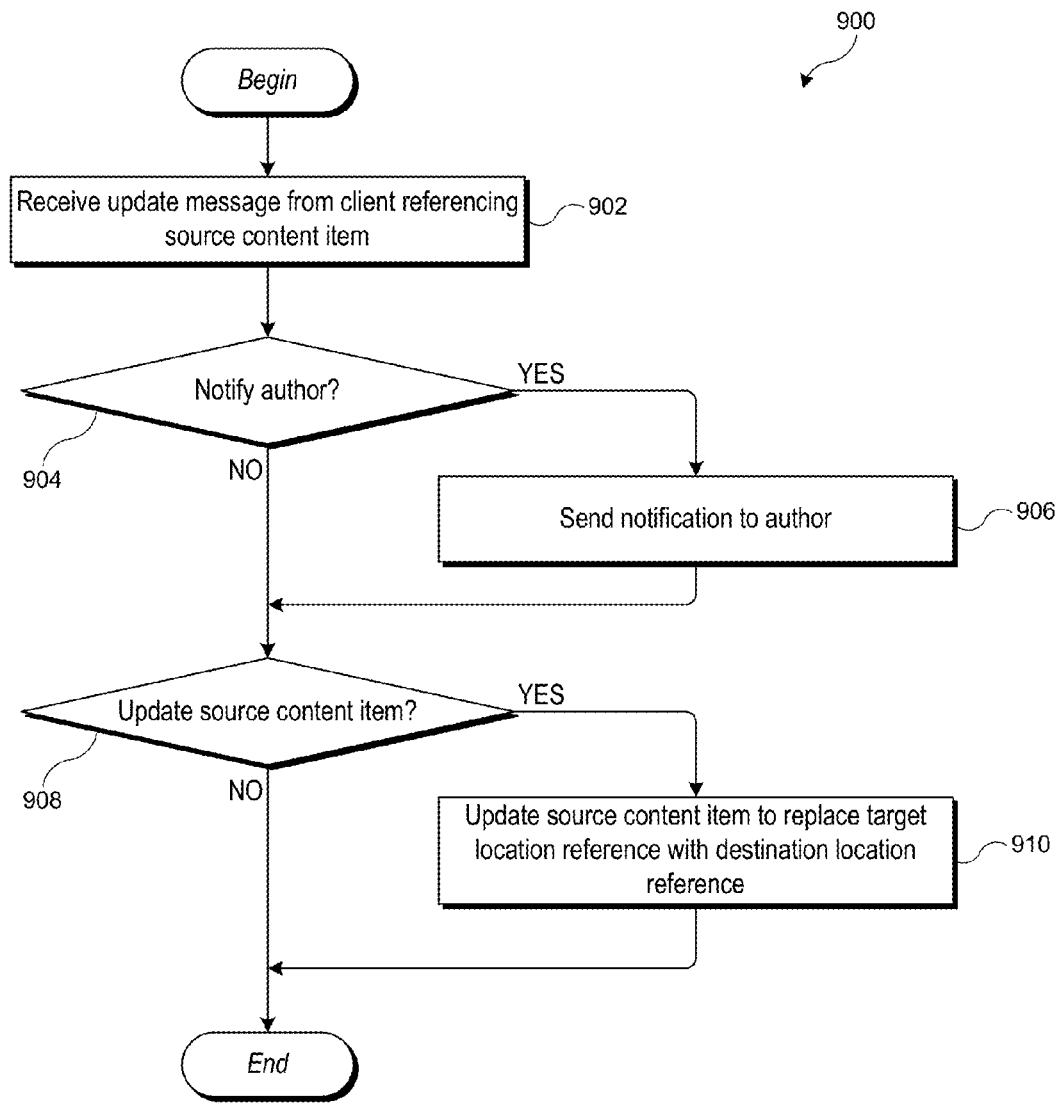
FIG. 9 is a flow diagram of a process for updating a content item according to an embodiment of the present invention.

As described above, a client can notify a source server when a redirect event occurs in response to following a link to a target location reference in a source content item obtained from the source server. For example, the client can send an update message to the source server. The source server can (but need not) respond to the client, e.g., to acknowledge receipt of the update message. Regardless of whether a response is sent to the client, the source server can take actions in response to the redirect event. FIG. 9 is a flow diagram of a process 900 that can be implemented in a source server, e.g., source server 304 of FIG. 3, according to an embodiment of the present invention. A source server can be any server that provides access to content items and is capable of receiving update messages from clients.

Process 900 begins at block 902, where server 304 can receive an update message from a client, indicating an update to a source content item. The update message can identify the specific source content item and provide additional information. For example, message format 330 of FIG. 5 or similar message formats can be used.

At block 904, process 900 can determine whether to notify an author of the content item identified in the message. If the author should be notified, process 900 can send the notification at block 906. As used here, the "author" of a content item can be a user who created the item, the user who last edited the item, a user or team of users tasked with responsibility for maintaining the content item, a site administrator, an editorial review team, or anyone else. Notifications can be provided via email, instant message, text message (e.g., SMS or MMS), dashboard interface to the content items, a log file that is reviewable by authors at their convenience, or any other communication mechanism as desired. While not required, notification to an author can allow an opportunity for a responsible person to verify whether an update should or should not be applied, which can improve security.

In some embodiments, an author is always notified when an update message is received. In other embodiments, the server can screen updates before notifying authors, e.g., to detect malicious messages. For example, the server may maintain a record of which clients requested particular content items (e.g., based on headers in HTTP GET requests) and can verify that the client actually did request the content item for which it is reporting an update message. If there was no prior (or recent) request, the update message can be disregarded and the author does not need to be notified. As another example, the server can verify that the old location reference actually exists within the source content item and/or that the new location reference is to a location that is not known to be malicious. If the message is attempting to replace the target location reference with a reference to a known malicious site or attempting to update a location reference that is not present in the source content item, the server can disregard the message and not notify an author. In some embodiments, if a potentially malicious update message is detected, the server can notify site security personnel.

In some embodiments, certain types of update messages that are not malicious (or suspect) can also be ignored without authorial intervention. For example, as described above, some clients may unconditionally report an update message in response to any redirect event. Accordingly, a source server that receives update messages can apply rules to filter out updates it does not intend to act upon. For instance, a server may filter out update messages that appear to be based on temporary redirection, client-specific redirection, or use of redirection services such as bit.ly and t.co. Authors can be but need not be notified of such updates. As another example, if the update has already been made in the source content item, the server can disregard the update message as being obsolete.

In some embodiments, a server can determine that an update should be accepted without notifying an author. For instance, if the site is being reorganized and the update indicates a new location reference within the same site, the server may be able to determine that it is legitimate without authorial intervention.

At block 908, process 900 can determine whether to update the source content item. For example, if an author was notified at block 906, process 900 can wait for the author to confirm that the update should be made. If process 900 determined that the update is probably (or definitely) malicious, a decision not to update can be made at block 908 without requesting or waiting for authorial confirmation. If process 900 determined that the update can be accepted without authorial confirmation (e.g., in the case of internal redirection), then a decision to update can be made at block 908 without waiting for authorial confirmation.

At block 910, if the decision to update was made, the source content item can be updated based on information received in the update message. For example, all instances of the target location reference in the source content item can be replaced with the destination location reference. In some embodiments, the server can find and replace references in other content items as part of the same process. After the updates are made or the decision is made not to update, process 900 can end.

The messages and processes described herein can facilitate access to interlinked content items in a decentralized system such as the World Wide Web. As described above, from a client's perspective, using these or similar processes can reduce the occurrence of redirection as the user browses items and revisits previous items. In some instances, the process can also facilitate the task of locating a particular item of interest in a browser history or a previously visited content item by replacing references to locations at redirection services with references to the actual content items to which the services redirect.

From a content provider's perspective, processes described herein can help keep content items up-to-date. It can be difficult or impossible to systematically test and update location references in a content item (and even more difficult for a large collection of content items); moreover, systematic testing and updating can involve a large amount of unnecessary work since some content items are rarely if ever accessed or used to link elsewhere. By obtaining and processing update messages from clients that have "discovered" a redirection in a content item, the content provider can keep content items—or at least those items that are being actively used—more up to date. Authorial review and/or other measures, examples of which are described above, can be incorporated to help prevent malicious updates. Where used, authorial review can be further facilitated, e.g., by presenting the author with links to view the content item and the content item corresponding to the destination location reference; the author can accept or reject the proposed change without having to manually edit the content item. In some embodiments, an authorial approval can be further leveraged to update multiple content items that contain the same location reference that is being updated in one item.

While the invention has been described with respect to specific embodiments, one skilled in the art will recognize that numerous modifications are possible. For example, while embodiments described above may make reference to web pages as the content items, other types of content items can also be the subject of browsing. Examples include document files (which may be stored locally on the user's computer or remotely), photos, media items, content streams (e.g., different TV channels and/or video-streaming channels and/or audio-streaming channels. Similarly, references above to URLs, HTTP, and other specific protocols and formats associated with the web are intended as illustrative and not limiting; other protocols and formats can be substituted.

A browser client can include any computer program or other tool that allows a user to view and interact with content items. While browsers can be implemented as software executing on appropriate hardware, other implementations are possible, and a browser can be adapted for specific types of content items (e.g., web browser, document browser, etc.).

Moreover, embodiments of the invention are not limited to open systems such as the Internet; those skilled in the art will recognize that similar technology can be implemented within any network environment, including a real or virtual private network (e.g., within a corporation's internal document server or error reporting system), local area network, or any other network on which content items that can provide location references to other content items are maintained.

Further, although embodiments described above make reference to a browser, the present invention is not limited to browsers. Any executable program or other tool that is capable of interacting with content items and servers as described herein can operate as a client, and any source of content items can be a server.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of accessing content, the method comprising:
   obtaining, by a client computer, a source content item from a source server, the source content item including a target location reference identifying a location of a target content item on a target server;
   requesting, by the client computer, the target content item from the target server based on the target location reference;
   receiving, by the client computer, a response message from the target server, the response message indicating that the client is being redirected and including a destination location reference identifying a location of a destination content item on a destination server;
   requesting, by the client computer, the destination content item from the destination server based on the destination location reference;
   sending, by the client computer, a redirection update message to the source server, the redirection update message including an identifier of the source content item, an indication that the target location reference in the source content item has been redirected, and the destination location reference; and
   presenting, by the client computer, the destination content item to a user.

2. The method of claim 1 wherein the destination server is the target server.

3. The method of claim 1 wherein the destination server is a server other than the target server.

4. The method of claim 1 further comprising:
   receiving, by the client computer, a response from the destination server indicating that the client is not permitted to access the destination content item directly; and
   including, in the redirection update message, an indication that the client is not permitted to access the destination content item directly.

5. The method of claim 1 wherein obtaining the source content item is performed in response to a first user input and wherein requesting the target content item is performed in response to a second user input.

6. The method of claim 1 wherein the target location reference and the destination location reference are Uniform Resource Locators (URLs).

7. The method of claim 1 further comprising:
   updating, by the client computer, a client activity history to remove the target location reference and replace the target location reference with the destination location reference.

8. The method of claim 1 further comprising:
   updating, by the client computer, a local copy of the source content item to remove the target location reference and replace the target location reference with the destination location reference.

9. A non-transitory computer readable storage medium having stored thereon program instructions that, when executed by a processor of a client computer, cause the client computer to execute a method comprising:
   obtaining a source content item from a source server, the source content item including a target location reference identifying a location of a target content item on a target server;
   requesting the target content item from the target server based on the target location reference;
   receiving a response message from the target server, the response message indicating a redirection and including a destination location reference identifying a location of a destination content item on a destination server;
   requesting the destination content item from the destination server based on the destination location reference;
   determining, based at least in part on the response from the target server, whether the source server should be notified that the client computer was redirected; and
   in the event that the source server should be notified, sending a redirection update message to the source server, the redirection update message including an identifier of the source content item, an indication that the target location reference in the source content item has been redirected, and the destination location reference.

10. The computer readable storage medium of claim 9 wherein determining whether the source server should be notified includes determining whether the response indicates that the redirection is permanent.

11. The computer readable storage medium of claim 9 wherein determining whether the source server should be notified is based at least in part on whether the target server is affiliated with a known redirection service provider.

12. The computer readable storage medium of claim 9 wherein obtaining the source content item is performed in response to a first user input and wherein requesting the target content item is performed in response to a second user input.

13. The computer readable storage medium of claim 9 wherein the target location reference and the destination location reference are Uniform Resource Locators (URLs).

14. The computer readable storage medium of claim 9 further comprising:
   updating, by the client computer, a client activity history to remove the target location reference and replace the target location reference with the destination location reference.

15. The computer readable storage medium of claim 9 further comprising:
   updating, by the client computer, a local cached copy of the source content item to remove the target location reference and replace the target location reference with the destination location reference.

16. A method comprising:
    receiving, at a server, a request from a client for a source content item;
    sending, by the server, the source content item to the client, the source content item including a target location reference identifying the location of a target content item on a target server;
    receiving, by the server, a redirection update message from the client, the redirection update message including an identifier of the source content item, an indication that the target location reference in the source content item has been redirected, and a destination location reference to which the target location reference has been redirected; and
    updating the source content item based on the redirection update message.

17. The method of claim 16 wherein updating the source content item includes:
    sending a notification to an author of the source content item; and
    receiving a response from the author, the response including a confirmation that the source content item should be updated, wherein the source content item is updated based on the response.

18. The method of claim 16 wherein updating the source content item includes replacing the target location reference with the destination location reference.

19. The method of claim 16 wherein the redirection update message is a HyperText Transfer Protocol (HTTP) message of a type defined as indicating that the client is reporting a redirect event.

20. The method of claim 16 wherein the target location reference and the destination location reference are Uniform Resource Locators (URLs).

21. A non-transitory computer readable storage medium having stored thereon program instructions that, when executed by a processor of a server computer, cause the server computer to execute a method comprising:
    receiving a request from a client for a source content item;
    sending the source content item to the client, the source content item including a target location reference identifying the location of a target content item on a target server;
    receiving a redirection update message from the client, the redirection update message including an identifier of the source content item, an indication that the target location reference in the source content item has been redirected, and a destination location reference to which the target location reference has been redirected;
    determining, based at least in part on the redirection update message, whether the source content item should be updated; and
    in response to determining that the source content item should be updated, updating the source content item based on the redirection update message.

22. The computer readable storage medium of claim 21 wherein determining whether the source content item should be updated includes:
    notifying an author of the source content item that the redirection update message was received; and
    receiving a confirmation response from the author, the confirmation response indicating whether the source content item should be updated.

23. The computer readable storage medium of claim 21 wherein determining whether the source content item should be updated includes:
    comparing the destination location reference to a set of recognized malicious references,
    wherein a determination that the source content item should not be updated is made in the event the destination location reference matches one of the recognized malicious references.

24. A system comprising:
    a memory; and
    one or more processors configured to:
    obtain a source content item from a source server, the source content item including a target location reference identifying a location of a target content item on a target server;
    request the target content item from the target server based on the target location reference;
    receive a response message from the target server, the response message indicating that a client is being redirected and including a destination location reference identifying a location of a destination content item on a destination server;
    request the destination content item from the destination server based on the destination location reference;
    send a redirection update message to the source server, the redirection update message including an identifier of the source content item, an indication that the target location reference in the source content item has been redirected, and the destination location reference; and
    present the destination content item to a user.

25. The system according to claim 24, further comprising one or more processors configured to:
    receive a response from the destination server indicating that the client is not permitted to access the destination content item directly; and
    include in the redirection update message, an indication that the client is not permitted to access the destination content item directly.

26. The system according to claim 24, wherein the target location reference and the destination location reference are Uniform Resource Locators (URLs).

27. The system according to claim 24, further comprising one or more processors configured to:
    update a client activity history to remove the target location reference and replace the target location reference with the destination location reference.

28. The system according to claim 24, further comprising one or more processors configured to:
    update a local copy of the source content item to remove the target location reference and replace the target location reference with the destination location reference.

* * * * *